(12) United States Patent
Marupaduga (10) Patent No.: US 12,096,372 B1
(45) Date of Patent: Sep. 17, 2024

(54) DUAL CONNECTIVITY UPLINK POWER MANAGEMENT

(71) Applicant: T-Mobile Innovations LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 383 days.

(21) Appl. No.: 17/472,578

(22) Filed: Sep. 10, 2021

(51) Int. Cl.
*H04W 52/14* (2009.01)
*H04W 52/36* (2009.01)
*H04W 76/15* (2018.01)

(52) U.S. Cl.
CPC ....... *H04W 52/146* (2013.01); *H04W 52/367* (2013.01); *H04W 76/15* (2018.02)

(58) Field of Classification Search
CPC .. H04W 52/18; H04W 52/146; H04W 52/246
See application file for complete search history.

(56) References Cited

U.S. PATENT DOCUMENTS

| | | | | |
|---|---|---|---|---|
| 2014/0254471 | A1* | 9/2014 | Fang | H04W 84/047 370/329 |
| 2019/0104478 | A1* | 4/2019 | Park | H04W 76/00 |
| 2019/0159134 | A1* | 5/2019 | Wang | H04L 5/0082 |
| 2019/0268878 | A1* | 8/2019 | Nakazawa | H04W 72/04 |
| 2020/0092822 | A1* | 3/2020 | Kang | H04W 52/346 |

\* cited by examiner

*Primary Examiner* — Joseph E Avellino
*Assistant Examiner* — Maryam Emadi
(74) *Attorney, Agent, or Firm* — Shook, Hardy & Bacon L.L.P.

(57) ABSTRACT

Systems and methods are provided for managing uplink transmission power associated with one wireless link of a dual connectivity session. The location of one or more UEs within a sector or cell is determined and one or more uplink network parameters may be determined or observed at an access point. Upon exceeding a threshold location factor and/or exceeding one or more uplink network parameter thresholds, one or more UEs served by the access point may be instructed to reduce the maximum transmission power associated with a wireless link of a dual connectivity session.

18 Claims, 5 Drawing Sheets

DUAL CONNECTIVITY UPLINK POWER MANAGEMENT

SUMMARY

The present disclosure is directed, in part, to managing uplink power of a wireless device, substantially as shown in and/or described in connection with at least one of the figures, and as set forth more completely in the claims.

In aspects set forth herein, a maximum uplink power for one transmitter in a user equipment (UE) capable of dual connectivity or other dual-transmission is limited in order to reduce the overall noise in the wireless system. While typically a maximum uplink power is hard-set into a phone and is not capable of dynamic modification, aspects herein enable one uplink transmission power to be reduced at a UE in response to certain network conditions. Further, UEs will increasingly be configured to communicate using dual connectivity, allowing a single UE to communicate with one or more nodes using two or more wireless links. Wireless networks, therefore, may experience increasing noise as the numbers of links and the amount of radiated power from UEs increases. For example, in traditional single-link sessions (e.g., in a 3G network), a single UE may only need to use 20 dBm in the uplink for the uplink signal to reach the node; however, in a multi-link environment, that same UE may use 20 dBm to transmit in the uplink on both wireless links—doubling the amount of radiated power in the wireless environment and increasing overall noise in the uplink. With increasing noise, the wireless network may be negatively affected and the transmitting UE may be caused to transmit at increasingly higher powers (up to the link maximum transmit power) in order for a signal to reach the node, further increasing noise and increasing UE battery drain.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage to a particular area (i.e., cell). The base stations are employed to broadcast and transmit transmissions to user devices of the telecommunications network within the cell. An access point may be considered to be a portion of a base station that may comprise an antenna, a radio, and/or a controller. In aspects, an access point is defined by its ability to communicate with a UE according to a single protocol (e.g., 3G, 4G, LTE, 5G, and the like) and/or a single frequency (or frequency band) in one or more subdivisions (i.e., a sector) of the cell. In other aspects, a single access point may communicate with a UE according to multiple protocols or multiple frequencies. As used herein, a base station may comprise one access point or more than one access point. Factors that can affect the telecommunications transmission include, e.g., location and size of the base stations, frequency of the transmission, among other factors.

Generally speaking, modern UEs are increasingly equipped with at least two transmitters or are otherwise configured or enable to utilize multiple wireless links to simultaneously or nearly-simultaneously communicate using two or more wireless links. While generally referred to herein as dual connectivity herein, the present disclosure may be relevant to many circumstances associated with communicating on multiple wireless links, including E-UTRAN New Radio Dual Connectivity (ENDC) and carrier aggregation, for example. Permitting a UE to enter a dual connectivity session has certain benefits, including potentially substantial increases in UE throughput. Dual connectivity may also be used to process discrete or distinct functionality; for example, a first wireless link may be used for a first functionality (e.g., voice call or SMS) and a second wireless link may be used for a second functionality (e.g., a data session). As communication protocols rapidly evolve from 3G, to 4G/LTE, to 5G, some exemplary scenarios relevant to the present disclosure specifically envision that a UE may benefit from connecting to more than one access point using more than one protocol or frequency. For example, a 5G communication session may have a higher throughput, used for a data session, and a 4G communication session may have characteristics that make it more suitable for a voice session. Similarly, a higher frequency may be preferable for a data session and a lower frequency more suitable for a voice session. Thus, it may be desirable for the UE to be simultaneously connected to more than one access point using more than one protocol or frequency. Unfortunately, dual connectivity also has certain drawbacks, including potentially substantial negative effects on other UEs being served by the access point due to high noise rise at the access point.

Whether using dual connectivity or single connectivity, a UE may have a pre-set maximum total uplink power. Conventionally, a communication session between a UE and an access point comprises an uplink handshake, wherein the uplink handshake is an uplink signal from the UE to an access point, conventionally transmitted at the pre-set maximum uplink power. Once the handshake occurs, the network and/or the device may determine that the uplink power may be reduced (e.g., if, based on proximity or line of sight, it is determined that only half of the maximum pre-set uplink power is necessary to effectively propagate the uplink signal to the access point). In some circumstances, it is unlikely that the network would instruct the UE to materially reduce its uplink power; for example, when a UE is at or near a cell edge or if the access point is experiencing high noise (or a low UpLink Receive Signal Strength Indicator (ULRSSI)), when greater uplink transmit powers are required to get uplink signals to the access point in order to avoid dropped calls or other adverse disruptions. Further, a positive correlation generally exists between the number of UEs, regardless of their location in the sector served by an access point and noise at that access point. It has also been found that increasing noise (i.e., noise rise) is strongly correlated with an increased call drop rate.

The present disclosure is directed to systems, methods, and computer readable media that are an improvement over conventional communications between a UE and an access point. In accordance with aspects described herein, network parameters for a wireless communication session between a UE and each of a first access point and second access point can be collected and/or analyzed to dynamically determine to what extent one or more UEs should have one or more of their uplink transmission powers modified when the uplink experiences conditions that are likely to lead to service degradation (e.g., increase call drop rate). Specifically, in a dual connectivity scenario, when a UE utilizes two or more wireless links, the uplink in wireless network may become sufficiently noisy that service degradation occurs. Accordingly, embodiments of the present disclosure utilize UE location and/or one or more uplink network parameters in order to determine that a transmission power associated with one wireless link of a UE engaged in a dual connectivity session should be reduced.

As employed herein, user equipment (UE) (also referenced herein as a user device or wireless communications device (WCD)) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

As used herein, user devices that are spatially distributed with respect to a first and second access point may be said to be in different locations relative to one or more access points. That is, a first device's location may be described herein as being further from a first access point, relative to a second device. Such distance-related terminology may be read to mean a distance at ground level between the ground level of the access point and the ground level of the device, it may refer to the distance actually traveled by the signal (in aspects, affected by multipath, reflection, etc), and/or it may refer to a signal strength (e.g., a first device is further from an access point than a second device based on the downlink signal received at the first device being weaker than the downlink signal received at the second device).

Accordingly, a first aspect of the present disclosure is directed to a system for managing uplink maximum transmission power in a WCD. The system comprises a first access point configured to receive a first wireless uplink signal from the WCD, wherein a first maximum uplink power is used by a first transmitter of the WCD to transmit the first wireless uplink signal to the first access point in a dual connectivity session, the first wireless uplink signal communicated to the first access point according to a first wireless communication protocol. The system further comprises a second access point configured to receive a second wireless uplink signal from the WCD, wherein a second maximum uplink power is used by a second transmitter of the WCD to transmit the second wireless uplink signal to the second access point in the dual connectivity session, the second wireless uplink signal communicated to the second access point according to a second wireless communication protocol. The system also comprises a processor configured to perform operations comprising determining that a number of WCDs having dual connectivity sessions disposed in an area served by the second access point exceeds a predetermined quantity threshold, the number of WCDs comprising the WCD, wherein each of the number of WCDs is connected to the second access point and determining that an uplink noise level at the second access point exceeds a predetermined noise threshold. The operations also comprise instructing the WCD to reduce the second maximum uplink power.

A second aspect of the present disclosure is directed to a method for managing uplink maximum transmission power in a WCD. The method comprises receiving, by a first access point, a first set of uplink signals on a first wireless link from a plurality of WCDs and receiving, by a second access point, a second set of uplink signals on a second wireless link from the plurality of WCDs. The method further comprises determining that the plurality of WCDs exceeds a predetermined quantity threshold a quantity of WCDs and determining that at least one uplink network parameter for the second access point exceeds a predetermined performance threshold. The method also comprises instructing each WCD of a portion of the plurality of WCDs to reduce a maximum transmission power associated with transmitting on the second wireless link.

Another aspect of the present disclosure is directed to another system for managing uplink maximum transmission power in a WCD. The system comprises a first access point configured to receive a first wireless uplink signal from the WCD, wherein a first maximum uplink power is used by a first transmitter of the WCD to transmit the first wireless uplink signal to the first access point. The system further comprises a second access point configured to receive a second wireless uplink signal from the WCD, wherein a second maximum uplink power is used by a second transmitter of the WCD to transmit the second wireless uplink signal to the second access point. The system also comprises a processor configured to perform operations comprising determining that a number of WCDs are disposed in a cell edge region of a sector served by at least one of the first and second access points exceeds a predetermined location threshold and determining that at least one uplink network parameter exceeds a predetermined performance threshold. The operations also comprise instructing the WCD to reduce the second maximum uplink power.

Figure 1:
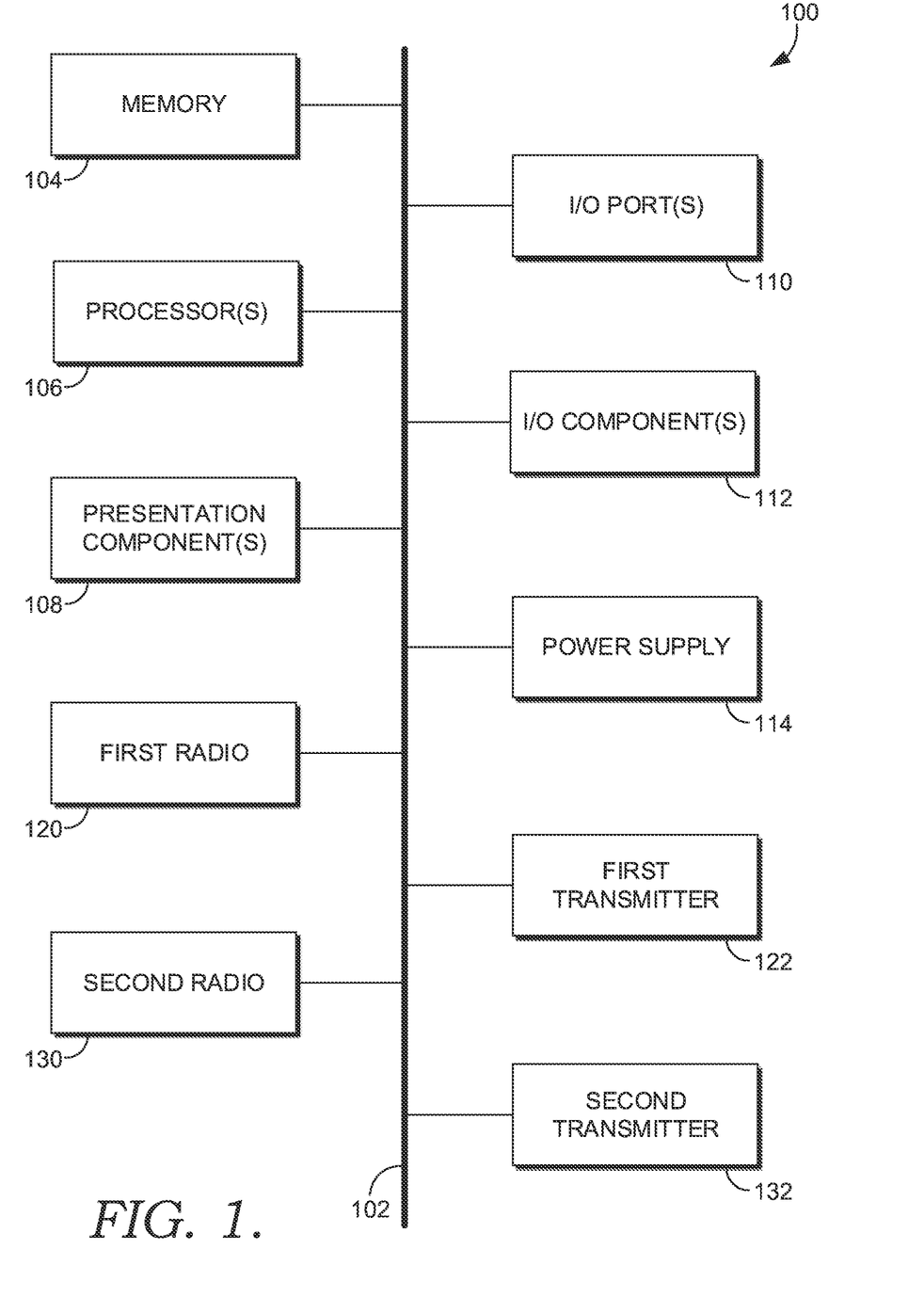
FIG. 1 depicts a diagram of an exemplary computing environment suitable for use in implementations of the present disclosure.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof).

Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate with a wireless network on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VOLTE, or other VOIP communications. In aspects, the first radio 120 and the second radio 130 may be configured to communicate using the same protocol but in other aspects they may be configure dot communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies.

Figure 2:
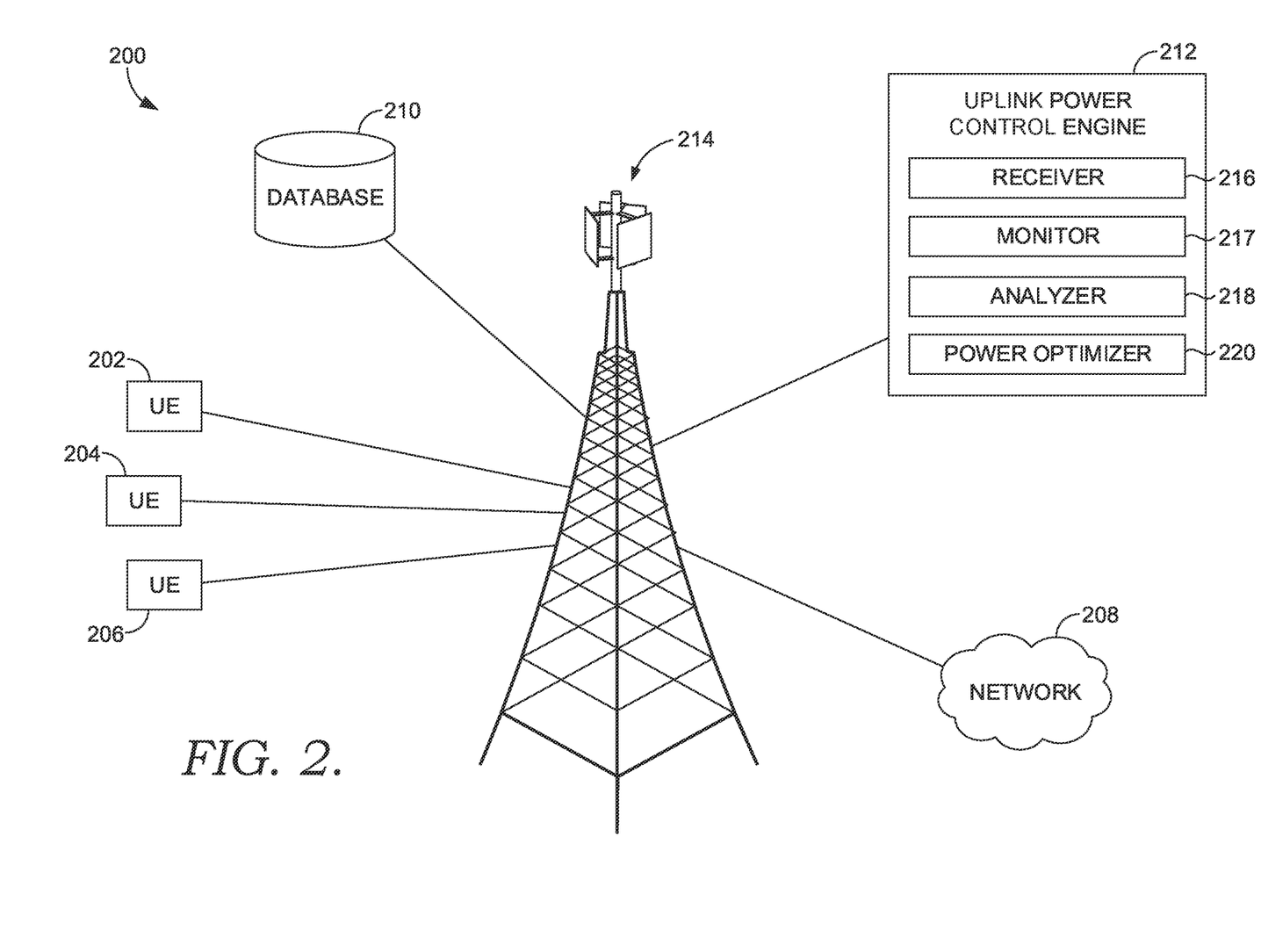
FIG. 2 depicts a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user devices (items 202, 204, and 206), access point 214 (which may be a cell site, base station, or the like), network 208, database 210, and uplink power control engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, the user devices (items 202, 204, and 206) can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a user device (items 202, 204, and 206) comprises a wireless or mobile device that uses one or more wireless links to communicate with a wireless network for the provision of desired resources (e.g., voice and/or data communication). In this regard, the user device can be any mobile computing device that communicates by way of a wireless network, for example, a 3G, 4G, 5G, LTE, CDMA, or any other type of network.

In some cases, the user devices (items 202, 204, and 206) in network environment 200 can optionally utilize network 208 to communicate with other computing devices (e.g., a mobile device(s), a server(s), a personal computer(s), etc.) through access point 214, using one or more wireless links between each of the user devices and the cell site 214. Though discussed in the singular, access point 214 may take the form of multiple distinct sites, may provide service to one or more cells, may comprise one or more base stations, and/or may comprise one or more nodes or access points. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to user devices, such as user devices 202, 204, and 206. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network and may use one or more frequencies or frequency bands to communicate with any one or more of the user devices 202-206.

In some implementations, access point 214 is configured to communicate with user devices, such as user devices 202, 204, and 206 that are located within the geographical area, or cell, covered by radio antennas of cell site 214. Access point 214 may include one or more base stations, base transmitter stations, radios, antennas, antenna arrays, power amplifiers, transmitters/receivers, digital signal processors, control electronics, GPS equipment, and the like. In certain aspects, the access point 214 may be a master node in a dual connectivity session, such as in an ENDC session. In other aspects, the access point 214 may be one or more secondary nodes that is contact with a particular user device and in communication with a master node (via a networked interface such as an X2 interface). The access point 214 may take the form of a split mode access point, which may, using one or more nodes and/or radios, communicate with a user device using a first set of wireless links according to a first wireless communication protocol while simultaneously (or nearly simultaneously) communicating with the user device using a second set of wireless links according to a second wireless communication protocol.

As shown, access point 214 is in communication with uplink power control engine 212, which comprises various components that are utilized, in various implementations, to perform one or more methods for managing uplink transmission powers of one or more user devices in the wireless environment 200. In some implementations, the uplink power control engine 212 comprises components including a receiver 216, a monitor 217, an analyzer 218, and a power optimizer 220. However, in other implementations, more or less components than those shown in FIG. 2 may be utilized to carry out aspects of the invention described herein.

The receiver 216 of the dynamic beamforming engine 212 is generally responsible for receiving information from various user devices, such as user devices 202, 204, and 206, which are within the coverage area of access point 214. Information sent from a user device to the access point 214 may comprise location information of the user device and network parameters determined at or by the user device that includes information on how good or bad the communication channel quality is (SINR, pathloss, or the like) and the device power levels (maximum uplink powers, maximum total uplink power, current uplink power). Location information may be based on GPS or other satellite location services, terrestrial triangulation, an access point location, interpolation or estimation that involve the strength or quality of the uplink signal, or any other means of obtaining coarse or fine location information. Network parameters may indicate a realized uplink and/or downlink transmission data rate, observed signal-to-interference-plus-noise ratio (SINR) and/or signal strength at the user device, pathloss, or throughput of the connection. Location and/or network parameters may take into account the user device capability, such as the number of antennas and the type of receiver used for detection.

The monitor 217 is generally responsible for determining one or more uplink network parameters that may be utilized to perform the uplink power management operations, according to one or more embodiments discussed herein. As mentioned, some network parameters may be determined by the user device and passed to the receiver 216, most particularly downlink network parameters and location information associated with UEs such as UEs 202, 204, 206. Other network parameters, may be determined by the monitor 217, particularly those relevant to the uplink(s). The monitor 217 may determine or measure an uplink noise level observed in a particular uplink channel, at the access point and may track the noise over a period of time in order to determine noise rise (which may be expressed as a positive (noisier) or a negative (less noisy) value). The monitor 217 may determine, based on one or more network parameters and/or observations at the access point 214, a ULRSSI value. The monitor 217 may determine a plurality of uplink footprints emitted by each of the user devices 202, 204, and 206 (e.g., based on information communicated from a user device via the receiver 216, or based on the most recent uplink power instructions communicated from the access point 214 to a user device) and may track the location information of the user device 202-206 communicated from the receiver 216. As used herein, the term uplink footprint may be considered to be synonymous with a radiation pattern of a user device, such as user device 202, 204, and 206 at a particular time. The uplink footprint may generally refer to the area in space in which the user device 202, 204, and 206 emits a transitory signal having enough signal strength (dBm) to be effectively received and processed by an access point, such as access point 214, to sustain a wireless communication session. In aspects, the monitor 217 may determine a first uplink footprint for a first transmitter of the user device 202, 204, and 206 and determine a second uplink footprint for a second transmitter of the user device 202, 204, and 206.

The analyzer 218 is generally responsible for combining information from the receiver 216 and the monitor 217 in order to make determinations regarding uplink power control for one or more UEs, such as user devices 202-206. The analyzer may premise uplink power determinations on one or more of a UE load and an uplink network parameter. With respect to using UE load information, the analyzer 218 may consider how many UEs in a dual connectivity session are connected to a particular access point. In another aspect, the analyzer 218 may consider how the UEs are disposed within a coverage area (e.g., sector) of the access point 214. For example, the analyzer 218 may utilize UE location information and estimated, measured, or otherwise calculable information regarding the boundaries of the sector, including a cell edge. The analyzer may then determine how many dual connected UEs are at the cell edge or within a threshold range of the cell edge (e.g., as an absolute value such as 0.25, 0.5, 1, 2, or 5 miles from the cell edge, or as a proportion of the distance from the access point 214 to the cell edge, such as within 2%, 5%, 10% or 25% of said distance). In yet another aspect, uplink power determinations may be premised on one or more uplink network parameters, agnostic of UE load at the access point 214 and/or the extent to which UE(s) are located at or near a cell edge of the access point 214. Information may from the analyzer 218 may be communicated to the power optimizer 220.

The power optimizer 220 is generally responsible for utilizing information from the receiver 216, the monitor 217, and/or the analyzer 218 in order to make uplink power determinations for the UEs 202, 204, and 206 in the dual connectivity environment. As discussed above, if a UE, such as the first UE 202, is connected to the access point 214 using dual connectivity (i.e., the access point 214 is connected to the first UE 202 using two different protocols (e.g., 4G and 5G) or the first UE 202 is connected to a 4G access point (not pictured) in addition to the access point 214 comprising a 5G node), uplink power may be controlled since the first UE 202 can afford to lose a second connection without jeopardizing all connectivity. Accordingly, uplink power determinations may be made for one uplink channel for UEs that are connected to at least two different radios/nodes, particularly for uplink channels that are used primarily for non-voice payloads; a UE under these conditions is eligible, according to the present disclosure, for uplink power management of an uplink channel.

For eligible UEs, the power optimizer 220 may make uplink power determinations based on a threshold number of UEs within the threshold range of the cell edge (as determined by the analyzer 218 and discussed previously) alone, or in combination with one or more uplink network parameters exceeding a predetermined threshold. In a series of non-limiting examples meant to be illustrative: It could be determined that the uplink noise level at the access point 214 exceeds a predetermined threshold, it could be determined that uplink noise rise at the access point 214 has risen above a predetermined threshold or risen faster than a predetermined rate, and/or it could be determined that the ULRSSI exceeds a predetermined threshold, wherein the access point 214 is configured to provide the non-voice (e.g., 5G) connection to a UE that is eligible for uplink power management. In another aspect, the number of UEs connected to the access point 214 (i.e., UE load) may be taken into consideration for making power management decisions alone or in combination with UE location and/or one or more uplink network parameters. In response to determining that a power management condition has been met, the power optimizer 220 may communicate an instruction, via the access point 214 or the network 208 to the UE to reduce its 5G uplink power maximum. In one aspect, a UE may be instructed to reduce its 5G (i.e., non-voice) uplink power incrementally (e.g., 3 dB at a time) or to cease all uplink transmissions on an uplink channel (e.g., for a predetermined period of time). Further, uplink power management may be implemented for all UEs connected to the access point 214 or may be selectively implemented (e.g., based on when a UE becomes connected to the access point 214 (last connected, first to be power-modified) or based on where a UE is located vis-à-vis the cell edge of the access point 214 (furthest connected, first to be power-modified)).

Figure 3:
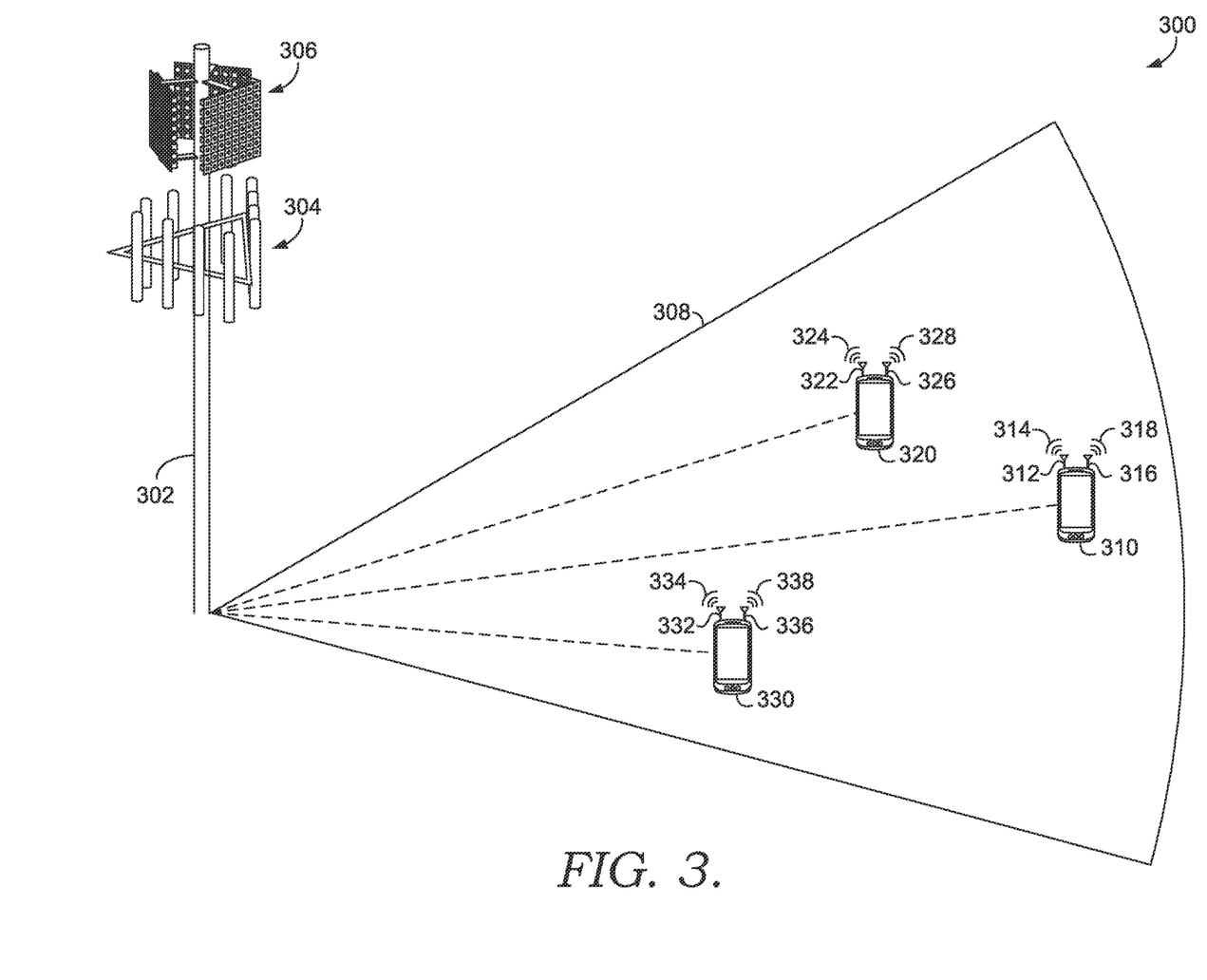
FIG. 3 illustrates a representation of a collocated first and second access point wirelessly communicating with one or more UEs in accordance with aspects herein.

Turning now to FIG. 3, a representation of a system 300 comprises a first access point 304 and a second access point 306 wirelessly communicating with a plurality of UEs, including a first UE 310, a second UE 320, and a third UE 330. Each of the first access point 304 and the second access point 306 may be disposed at or near a base station 302, and may be co-located at the same site. In other embodiments, the first access point 304 and the second access point 306 may be located at two different cell sites that are geographically separated. Though not illustrated to avoid confusion, the system 300 may comprise additional access points, such as additional secondary nodes, that could provide a user device with one or more additional or alternative wireless links to access a wireless network, such as the network 208 of FIG. 2. Further, despite the first access point 304 and the second access point 306 being shown as macro cells, the first access point 304 and/or the second access point 306 may be a macro cell, micro cell, femto cell, small cell, router, repeater, or any other nexus between the wireless communication device and the wireless network. Though depicted on a tower, each of the first access point 304 and the second access point 306 may be disposed in a variety of manners, including but not limited to, on a tower, on a structure, disposed on a mobile asset (e.g., a vehicle), in the window of a building, or the like.

Each of the first access point 304 and the second access point 306 may be said to provide service for a particular area, such as sector 308, which may be a radial portion of a cell, such as the cell served by the base station 302. As used herein, the term "sector edge" is meant to refer to the radial boundaries of a particular sector, such as sector 308; whereas, the term "cell edge" is meant to refer to the circumferential boundary of the cell (and the sector 308). The first access point 304, the second access point 306, and the plurality of UEs are but one example of suitable configurations and are not intended to suggest any limitations as to the scope of use or functionality of embodiments described herein. Neither should the configuration be interpreted as having any dependency or requirement relating to any one or combination of components illustrated.

In some aspects, the first access point 304 is a 4G node (e.g., eNodeB) and the second access point 306 is a 5G access point (e.g., gNodeB/NR). Each of a first UE 310, a second UE 320, and a third UE 330 may be said to be connected to each of the first access point 304 and the second access point 306 in a dual connectivity session. Specifically, the first UE 310 may use a first transmitter 312 to communicate a first uplink signal 314 to the first access point 304 (e.g., using 4G) and a second transmitter 316 to communicate a second uplink signal 318 to the second access point 306 (e.g., using 5G). The second UE 320 may use a first transmitter 322 to communicate a first uplink signal 324 to the first access point 304 (e.g., using 4G) and a second transmitter 326 to communicate a second uplink signal 328 to the second access point 306 (e.g., using 5G). The third UE 330 may use a first transmitter 332 to communicate a first uplink signal 334 to the first access point 304 (e.g., using 4G) and a second transmitter 336 to communicate a second uplink signal 338 to the second access point 306 (e.g., using 5G). As described in greater detail with respect to any one or more aspects of the network environment 200 of FIG. 2, one or more of the first UE 310, the second UE 320, and the third UE 330 may have their uplink power modified such that the maximum uplink transmit power used by the respective UE's second transmitter, used to communicate a second uplink signal to the second access point 306 may be reduced. In one example, if a number of UEs within a threshold distance of the cell edge exceeds a predetermined threshold, all UEs connected to the second access point 306 may have their maximum second uplink power reduced, or the UE furthest from the second access point 306 (i.e., the first UE 310) may be reduced until one or more uplink network parameters described with respect to FIG. 2 falls below a power management threshold.

Figure 4:
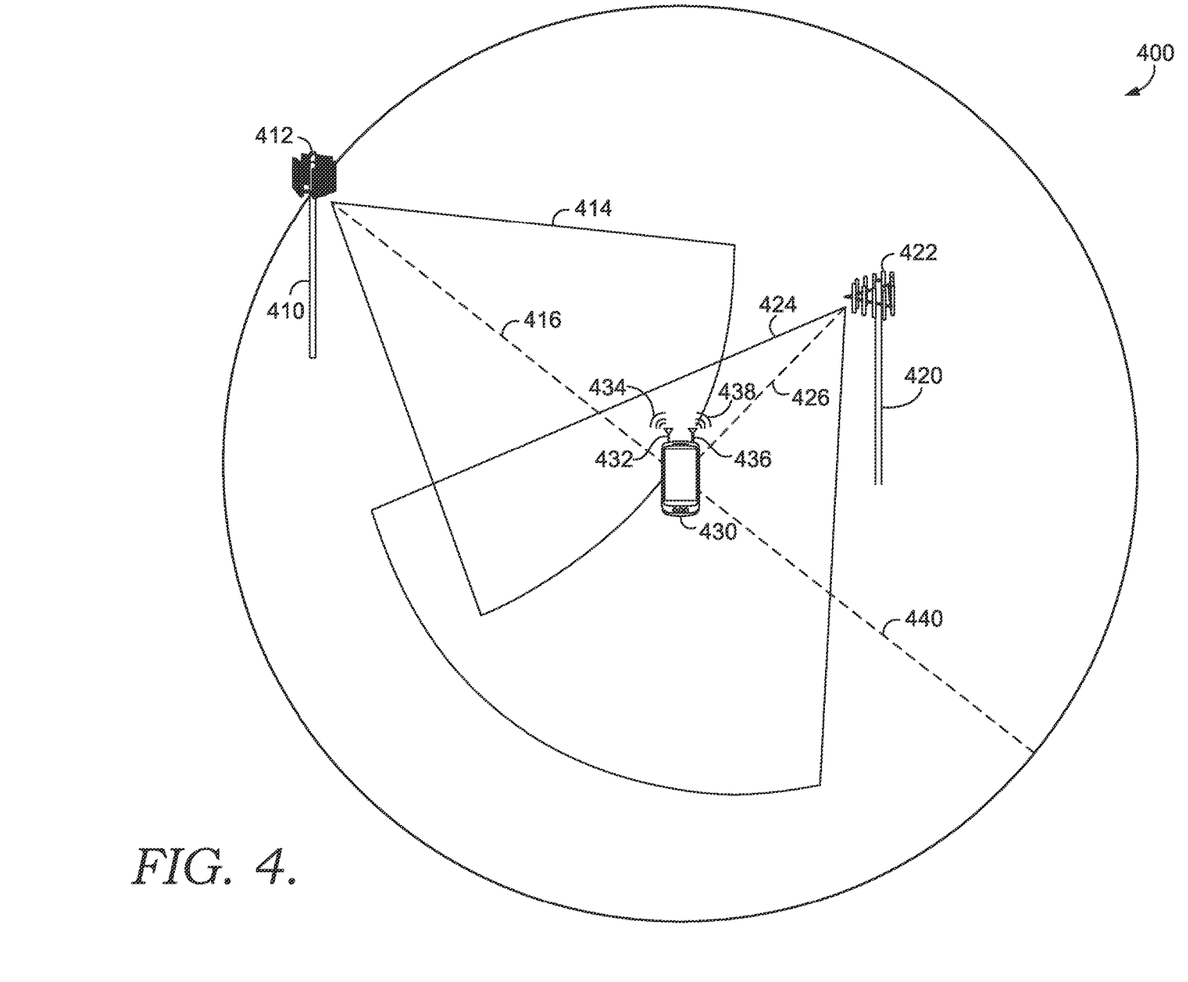
FIG. 4 illustrates a representation of a first and second access point wirelessly communicating with one or more UEs, in accordance with aspects herein.

Turning now to FIG. 4, an example of the present disclosure is illustrated wherein the first and second access points in a dual connectivity session are not collocated. A simplified network environment 400 may be said to comprise a UE 430, a first access point 412 at a first location 410 and a second access point 422 at a second location 420. The first access point 412 is configured to provide service to a first sector 414 and the second access point 422 is configured to provide access to a second sector 424. The UE 430 may be said to be disposed at a first distance 416 from the first access point 412, and a second distance 426 from the second access point 422. The UE 430 comprises a first transmitter 432 configured to communicate a first wireless signal 434 on a first wireless link to the first access point 412. The UE may also comprise a second transmitter 436 configured to transmit a second wireless uplink signal 438 on a second wireless link to the second access point 422. In aspects, the first wireless signal 434 may be communicated according to a first wireless protocol (e.g., 5G) and the second wireless signal may be communicated according to a different, second wireless protocol (e.g., 4G/LTE). Further, the first wireless uplink signal 434 may be used to communicate non-voice data (e.g., SMS, TCP/IP, or the like) from the UE 430 to the first access point 412 and the second wireless uplink signal 438 may be used to communicate voice data from the UE 430 to the second access point 422. In aspects wherein network environment 400 comprises an dual connectivity environment (e.g., eutran new radio dual connectivity), the first access point 412 may be a secondary node and the second access point 422 may be a master node; in these aspects, at least one of the first access point 412 and the second access point 422 may be a 5G node, and in some cases, both may be 5G nodes. Further, the first wireless uplink signal 434 and the second wireless downlink signal may use the same protocol (e.g., both 5G), but may use different frequency bands (e.g., the first wireless downlink signal uses 5G on an n41 band, and the second wireless downlink signal uses 5G on a millimeter wave band). Based on a maximum transmit power used on each of the first transmitter 432 and the second transmitter 436, the UE 430 may have an uplink range 440.

As seen in FIG. 4, the UE 430 is illustrated as being at or near the cell edge of the first sector 414 and the first access point 412 may be at or near the uplink range 440 of the UE 430. As described in greater detail with respect to FIGS. 2-3, if one or more power management conditions are met (e.g., UE load exceeded, too many UEs at/near cell edge, one or more uplink network parameters exceeding a predetermined threshold), the UE 430 may be instructed to reduce the maximum transmission power used to transmit the first wireless uplink signal 434 used to communicate a 5G signal to the first access point 412. The UE 430 may be instructed to reduce said maximum transmission power incrementally (e.g., 3 dB at a time) or may be instructed to temporarily suspend transmissions of the first transmitter 432 (e.g., for a predetermined period of time or until the UE 430 is handed off to a different 5G node.

Figure 5:
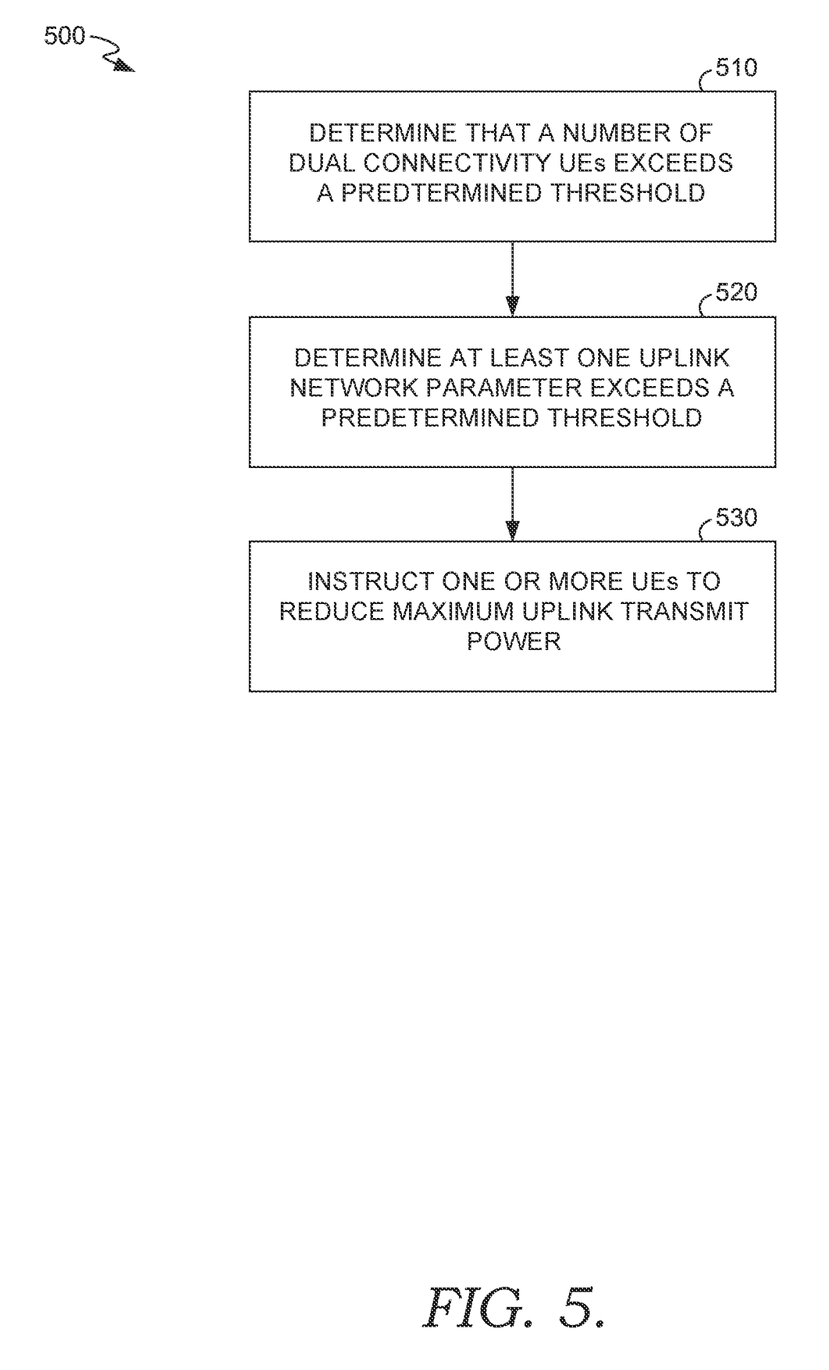
FIG. 5 depicts a flow diagram of an exemplary method for dual connectivity power control, in accordance with aspects herein.

FIG. 5 depicts a flow diagram of an exemplary method 500 for managing uplink power in a UE having a dual connectivity, in accordance with aspects of the present disclosure. Initially at step 510, number of UEs are determined to be in an area served by one access point of a group of two or more access points, with which each UE is engaged in a dual connectivity session. In aspects, a location associated with each of the number of UEs may also be determined. At step 510, it is determined that the number of UEs exceeds a predetermined threshold. For example the number of UEs may comprise 2N number of UEs and the predetermined threshold is N. If the number of UEs exceeds the predetermined threshold, the method 500 proceeds to step 520.

At step 520, it is determined that at least one uplink network parameter exceeds a predetermined threshold. The at least one uplink network parameter is determined in accordance with any one or more aspects of this disclosure, discussed with respect to FIGS. 2-4, and may comprise a noise level, noise rise, and/or ULRSSI. If the at least one uplink network parameter exceeds a predetermined performance threshold (e.g., if the noise level exceeds −90 or −80 dBm, or noise rise exceeds 10 dB), the method 500 proceeds to step 530. At step 530, one or more UEs are instructed to reduce a maximum uplink transmit power associated with a one or more wireless uplinks. The one or more UEs may be of the number of UEs described with respect to step 510 and the one or more wireless uplinks may be a 5G uplink or a signal communicated to a gNodeB. In aspects, the instruction to reduce the maximum uplink transmit power may occur in increments (e.g., reduce by 3 dBm) or it may be reduced to a prescribed level (e.g., reduce to −20 dBm). In yet other aspects, the instruction to reduce the maximum uplink transmit power may comprise an instruction to cease transmission on the second wireless uplink altogether. Regardless of the extent of the reduction instruction, the one or more UEs may lose their connection to one of the access points that were being used in the dual connectivity session.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for managing uplink maximum transmission power in a wireless communication device (WCD), the system comprising:
    a first access point configured to receive a first wireless uplink signal from the WCD, wherein a first maximum uplink power is used by a first transmitter of the WCD to transmit the first wireless uplink signal to the first access point;
    a second access point configured to receive a second wireless uplink signal from the WCD, wherein a second maximum uplink power is used by a second transmitter of the WCD to transmit the second wireless uplink signal to the second access point; and a processor, the processor configured to perform operations comprising:

determining that a count of a plurality of WCDs disposed in a cell edge region of a sector served by the second access points exceeds a predetermined location threshold, the cell edge region being an area within a predetermined threshold distance of a boundary of a geographic service area that is served by the second access point, and wherein the plurality of WCDs comprises the WCD;

determining that at least one uplink network parameter exceeds a predetermined performance threshold wherein the at least one uplink network parameter comprises an uplink noise level at the second access point and an uplink receive signal strength indicator (ULRSSI) of the second wireless uplink signal; and instructing the WCD to reduce the second maximum uplink power.

2. The system of claim 1, wherein the first access point and the second access point are co-located at a common site.

3. The system of claim 1, wherein the first access point is located at a first site and the second access point is located at a second site.

4. The system of claim 1, wherein the first access point comprises an eNodeB.

5. The system of claim 1, wherein the first access point communicates with the WCD using a first protocol and second access point communicates with the WCD using a second protocol.

6. The system of claim 5, wherein the first access point is a master node and the second access point is a secondary node in dual connectivity session.

7. The system of claim 6, wherein the first access point communicates with the WCD using an eNodeB and second access point communicates with the WCD using a gNodeB.

8. The system of claim 1, wherein the system further comprises a third access point configured to receive a third wireless uplink signal from the WCD, wherein a third maximum uplink power is used by a transmitter of the WCD to transmit the third wireless uplink signal to the third access point, and wherein the third access point is a secondary node in an ENDC connectivity session.

9. The system of claim 8, wherein the processor is further configured to instruct the WCD to reduce the third maximum uplink power.

10. The system of claim 1, wherein the predetermined performance threshold is a noise level greater than −90 dBm.

11. The system of claim 1, wherein the at least one uplink network parameter comprises an uplink noise rise at the second access point.

12. The system of claim 1, wherein the second access point is configured to receive a plurality of uplink signals from a plurality of WCDs disposed within a sector served by the second access point, the plurality of WCDs comprising the WCD.

13. The system of claim 12, wherein, of the plurality of WCDs, the WCD is located at a furthest distance from the second access point.

14. A method for managing uplink maximum transmission power in a wireless communication device (WCD), the method comprising:

receiving, by a first access point, a first set of uplink signals on a first wireless link from a plurality of WCDs;

receiving, by a second access point, a second set of uplink signals on a second wireless link from the plurality of WCDs;

determining that a quantity of the plurality of WCDs exceeds a predetermined threshold of WCDs, the plurality of WCDs comprising the WCD;

determining an uplink noise level in an area served by the second access point exceeds a predetermined noise threshold;

determining that an uplink receive signal strength indicator (ULRSSI) of an uplink signal received from the WCD exceeds an ULRSSI threshold; and instructing the WCD to reduce a maximum transmission power associated with transmitting on the second wireless link.

15. The method of claim 14, wherein the first wireless link comprises a first frequency and the second wireless link comprises a second frequency, the first frequency distinct from the second frequency.

16. The method of claim 15, wherein the second access point is a gNodeB.

17. A system for managing uplink maximum transmission power in a wireless communication device (WCD), the system comprising:

a first access point configured to receive a first wireless uplink signal from the WCD, wherein a first maximum uplink power is used by a first transmitter of the WCD to transmit the first wireless uplink signal to the first access point in a dual connectivity session, the first wireless uplink signal communicated to the first access point according to a first wireless communication protocol;

a second access point configured to receive a second wireless uplink signal from the WCD, wherein a second maximum uplink power is used by a second transmitter of the WCD to transmit the second wireless uplink signal to the second access point in the dual connectivity session, the second wireless uplink signal communicated to the second access point according to a second wireless communication protocol; and a processor, the processor configured to perform operations comprising:

determine a number of WCDs having dual connectivity sessions disposed in an area served by the second access point exceeds a predetermined quantity threshold, the number of WCDs comprising the WCD, wherein each of the number of WCDs is connected to the second access point;

determine an uplink receive signal strength indicator (ULRSSI) of an uplink signal from the WCD exceeds an ULRSSI threshold;

determine an uplink noise level at the second access point exceeds a predetermined noise threshold; and instruct the WCD to reduce the second maximum uplink power.

18. The system of claim 17, wherein the first access point is an eNodeB and the second access point is a gNodeB.

* * * * *